(12) United States Patent
Maandi

(10) Patent No.: US 6,903,147 B2
(45) Date of Patent: Jun. 7, 2005

(54) OPTIMIZED ANAEROBIC ADHESIVE COMPOSITIONS AND METHODS OF PREPARING SAME

(75) Inventor: Eerik Maandi, Rocky Hill, CT (US)

(73) Assignee: Henkel Corporation, Rocky Hill, CT (US)

( * ) Notice: Subject to any disclaimer, the term of this patent is extended or adjusted under 35 U.S.C. 154(b) by 242 days.

(21) Appl. No.: 10/305,279

(22) Filed: Nov. 26, 2002

(65) Prior Publication Data

US 2003/0125424 A1 Jul. 3, 2003

Related U.S. Application Data

(62) Division of application No. 09/482,820, filed on Jan. 13, 2000, now Pat. No. 6,509,394.

(51) Int. Cl.[7] .............................................. C09J 101/00
(52) U.S. Cl. ........................ 523/176; 523/202; 523/205; 524/189
(58) Field of Search ................................ 523/176, 202, 523/205; 524/189

(56) References Cited

U.S. PATENT DOCUMENTS

| | | |
|---|---|---|
| 2,895,950 A | 7/1959 | Krieble |
| 3,046,282 A | 7/1962 | Buckwalter |
| 3,203,941 A | 8/1965 | Krieble |
| 3,218,305 A | 11/1965 | Krieble |
| 4,287,330 A | 9/1981 | Rich |
| 4,321,349 A | 3/1982 | Rich |
| 5,109,036 A | 4/1992 | Charriere |
| 5,792,821 A | 8/1998 | Bowen |

FOREIGN PATENT DOCUMENTS

| | | | |
|---|---|---|---|
| JP | 58-7419 | 1/1983 | ......... C08F/299/06 |
| JP | 63-22809 | 1/1988 | ........... C08F/20/10 |
| JP | 7-90230 | 4/1995 | .............. C09J/4/02 |

OTHER PUBLICATIONS

Simon, "Using Neural Networks", Nov. 1999, Today's Chemist magazine, pp. 40–43.

Burnham, "Scientific Solutions via Design of Experiments", Nov. 1999, Scientific Computing and Instrumentation magazine, pp. 53–56.

"Unicenter TNG Performance Neugent", Computer Associates (6 pages) (1999).

"Product 243", Apr. 1998, Loctite Technical Data Sheet (2 pages).

Y. Grohens et al., "Experimental Design as a Route for Improving the Performances of Formul Epoxy Adhesives", Dec. 1996, Polymer Testing 16 (1997), pp. 417–427.

"An Introduction to Neural Computing", 1998–1999, Computer Associates International, Inc., pp. 1–13.

"The Knowledge Discovery Process—A Problem Solving Methodology", 1999, Computer Associates International, Inc., pp. 1–11.

*Primary Examiner*—Bernard Lipman
(74) *Attorney, Agent, or Firm*—Steven C. Bauman

(57) ABSTRACT

The present invention relates to anaerobic adhesive compositions which have been optimized using experimental design techniques to produce desired physical properties. A simplified cure system is disclosed which permits enhanced fixture and cure times.

16 Claims, No Drawings

OPTIMIZED ANAEROBIC ADHESIVE COMPOSITIONS AND METHODS OF PREPARING SAME

CROSS-REFERENCE TO RELATED APPLICATIONS

This application is a divisional of U.S. application Ser. No. 09/482,820, filed Jan. 13, 2000, now U.S. Pat. No. 6,509,394, the contents of which is incorporated herein by reference.

FIELD OF THE INVENTION

The present invention relates to anaerobic adhesive compositions which have been optimized to produce desired physical properties. Methods of producing optimized compositions using experimental design techniques are also disclosed.

BACKGROUND OF RELATED TECHNOLOGY

Anaerobic adhesive compositions are well known for their ability to remain in a liquid, unpolymerized state in the presence of oxygen and to cure to a solid state upon the exclusion of oxygen. Early work on anaerobic adhesive compositions concentrated on developing a cure system which improved the speed and/or bond strength of the adhesive composition. Various cure systems for anaerobic adhesive compositions have been developed to primarily focus on efficiently performing the redox reaction, which is the basis for anaerobic chemistry. Hydroperoxides were found to serve as a catalyst for the generation of a free radical. For example, U.S. Pat. No. 2,895,950 to Kriebel, discloses the inclusion of hydroperoxides in amounts of 0.1 to 10% by weight in anaerobic adhesive compositions to achieve faster cure times. Amines, used in amounts up to about 10% by weight, are also disclosed in the '950 patent as accelerators to generate free radicals of the peroxide.

Various accelerator compounds, such as tertiary amines, imides, polyamines, cyclicamines and arylamines, have been successfully included in anaerobic adhesive compositions to further increase cure speeds and completion of cure. See, e.g., U.S. Pat. No. 3,041,322 (tertiaryamines), U.S. Pat. No. 3,046,282 (imides), U.S. Pat. No. 3,203,941 (polyamines), and U.S. Pat. No. 3,218,305 (cyclic and arylamines), all to Kriebel. These accelerators were generally used in amounts of about 0.05 up to about 20%, depending on the type of amine and amount of peroxide present in the anaerobic adhesive composition. Ordinarily, according to Krieble, the amount of accelerator present was significantly less than the peroxide. Additionally, no teaching or suggestion is present in these patents of using specific relative amounts of peroxide to reducing agents.

Those persons of ordinary skill in the art acknowledge that peroxides serve as a free radical generating source which initiate free radical curing of the polymerizable anaerobic adhesive monomer compositions. To increase the speed at which the free radical is generated, accelerators are employed in combination with the peroxides to enhance the speed at which the peroxide free radical is generated. In so doing, the cure speed of the anaerobic adhesive composition is increased.

As anaerobic adhesive compositions have evolved, various combinations of peroxides and accelerators have been used. Recently, such compositions have employed a plurality of compounds as accelerators to serve as reducing agents for the peroxide to increase cure speed. The virtually infinite number of possible combinations of individual components and their relative amounts, have made formulating anaerobic adhesive compositions a complex exercise depending on the properties sought for the composition. While many current anaerobic adhesive compositions exhibit the ability to rapidly polymerize, optimum compositions for a desired set of properties has not been predictable. Thus, given the large number of potential combinations and permutations of anaerobic adhesive composition variables for a given set of desired properties, optimization has neither been practical nor achievable.

U.S. Pat. Nos. 4,287,330 and 4,321,349 to Rich disclose anaerobic adhesive compositions which include a hydrazine accelerator, along with peroxides and amines in amounts previously referred to herein, to increase the cure speed of the anaerobic curing monomer. The hydrazines are disclosed as being useful in amounts of about 0.1–5% by weight. No disclosure is found in the '330 and '349 patents with regard to achieving faster cure speed by adjusting the specific relative amounts of peroxide, hydrozine and amine. Anaerobic adhesive compositions have also conventionally employed primer compositions to speed their cure. On substrates such as stainless steel, zinc, dichromate, and cadmium, which are considered "slow" or relatively inactive materials for anaerobic cure, primer compositions have been considered necessary for quick fixture and cure times required of many applications.

The use of primer compositions requires an additional step prior to applying the anaerobic adhesive composition, which is often inconvenient and costly. Often the solvent used to carry the accelerator component in the primer is environmentally harmful and requires special handling and disposal. Moreover, ordinarily the user must wait until the solvent has evaporated before applying the adhesive.

Designed experimentation (DOE) techniques are known as a method of evaluating multiple factors during scientific experimentation. DOE techniques often use an artificial intelligence component known as a neural network. This technique uses software-generated models to systematically consider the extent to which different variable factors interact by considering many factors simultaneously, while conducting fewer experiments. Commercially available software, such as CAD/CHEM offered by Computer Associates, International, Ilandia, N.Y., produces models to predict the outcome for any given combination of factors. DOE techniques provide a way to combine such factors for products, processes and designing optimized compositions. It is not believed that DOE techniques have been applied to the optimization of anaerobic adhesive compositions. Instead, conventional one-factor-at-a-time (OFAT) techniques have been a common method of learning about the characteristics and improving upon the properties of anaerobic adhesive compositions.

Whereas the Kriebel patents disclosed anaerobic adhesive compositions with relatively few components, current commercially available anaerobic adhesive compositions include many additional components which are believed to participate in the cure mechanism. The ability to determine optimized compositions which are reduced to the least number of components would represent a significant advance in achieving desired properties, as well as representing significant simplification in the manufacturing process, reduction in the material cost and an increase in overall production efficiency. It would be further advantageous if such optimized compositions achieve faster fixture and cure times without the need for independent primer compositions or numerous accelerator combinations.

Moreover, there is a need for a method of generating an optimized composition based on a set of desired properties of the adhesive, whether these properties be in the uncured or cured form, or in the cure profile.

SUMMARY OF THE INVENTION

The present invention provides anaerobic adhesive compositions, reaction products of which demonstrate improved initial room temperature torque strength on an oxidizable element, which element participates in curing the composition through its oxidation. The inventive compositions include:

a.) at least one anaerobically curable (meth)acrylate monomer;

b.) a cure system for the (meth)acrylate monomer comprising:
  (i) at least one free radical generating material; and
  (ii) an acidic reducing agent for the free radical generating material, each of (i) and (ii) being present in substantially equal amounts; and
  (iii) an accelerator for the reduction of the free radical generating material.

The cure system is present in an amount sufficient to achieve about 30% or more of its 24 hour cure strength in about 5 minutes or less. The inventive composition is free of maleic acid in the amount of 0.1 to 1% by weight of the total composition.

In one aspect of the present invention there is provided for optimized anaerobic adhesive compositions which can develop a significant portion of their ultimate physical strength in substantially shorter times when compared to known anaerobic adhesive compositions. Compositions of the present invention also exhibit extremely fast fixture or set times when compared to known anaerobic adhesive compositions. These and other advantages are achieved using fewer components than previously thought possible.

Certain components in the anaerobic adhesive composition previously thought to be necessary, such as the use of multiple accelerators, have now been eliminated. Notwithstanding the plethora of prior anaerobic adhesive compositions known to those skilled in the art, the ability to achieve exceedingly fast fixture time and reach significant strength in a few minutes, in the absence of substrate primers has previously been unobtainable. Conventional methods of increasing fixture time or cure speed has required the use of substrate primers which include accelerator compounds for enhancing cure speed.

The present invention provides optimized anaerobic adhesive compositions which have a reduced number of components, yet which achieve the aforementioned advantages without the need for either the application of an independent primer composition, or a plurality of accelerating components. The reduction of components necessary for the anaerobic adhesive composition to cure provides the additional advantages of reduced material cost and increased convenience and overall manufacturing efficiency as compared to commercially known compositions.

In a further aspect of the invention there is provided an anaerobic adhesive composition which includes the following components:

a.) at least one anaerobically curable alkyl (meth)acrylate monomer present in amounts of less than 60% by weight of the total composition;

b.) a cure system for said (meth)acrylate monomer comprising:
  (i) at least one free radical generating material;
  (ii) an acidic reducing agent for said free radical generating material, each of (i) and (ii) being present in substantially equal amounts; and
  (iii) an accelerator for the reduction of said free radical generating material;

wherein said cure system is present in an amount sufficient to achieve about 30% or more of its 24 hour cured torque strength in about 5 minutes or less.

In still a further aspect of the invention there is provided a method of bonding substrates which includes the steps of combining in admixture:

(i) at least one anaerobically curable (meth)acrylate monomer;

(ii) at least one free radical generating material;

(iii) an acidic reducing agent for said free radical generating material, each of (i) and (ii) being present in substantially equal amounts; and (iv) an accelerator for the reduction of said free radical generating source.

wherein said anaerobic composition is free of maleic acid in the amount of 0.1 to 1.0% by weight of the total composition.

Methods of preparing and optimizing such anaerobic adhesive compositions are also disclosed. In particular, the use of DOE techniques which incorporate artificial intelligence components produce optimized compositions having properties heretofore not believed possible. Thus, in another aspect of the invention there is a method for optimizing an adhesive composition to produce a set of desired properties. The method includes the steps of:

a.) providing in a machine readable storage medium a data set of adhesive composition components;

b.) generating a statistically validated experimental design model comprising a set of adhesive compositions representing independent variables;

c.) generating objective test data of the set of adhesive composition from step b.), the test data results representing a set of dependent variables; and d.) establishing a correlation between the independent and dependent variables.

Carrying out the steps of this method produces an optimized composition for the physical properties desired.

DETAILED DESCRIPTION OF THE INVENTION

Curable polyolefinically unsaturated monomers may be used as the polymerizable, crosslinkable resin component including acrylic and methacrylic resins, and mixtures thereof. The term (meth)acrylic is used to refer to both types of resins.

Useful anaerobic curing monomers include the alkylene glycol diacrylates having the general formula:

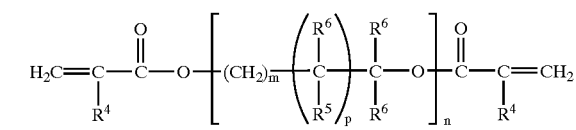

wherein $R^4$ is selected from the group consisting of hydrogen, halogen, and lower alkyl of 1–4 carbon atoms; $R^5$ is selected from the group consisting of hydrogen, —OH,

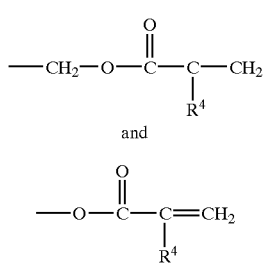
and $R^6$ is a radical selected from the group consisting of hydrogen, lower alkyl of 1–4 carbon atoms, hydroxyalkyl of 1–4 carbon atoms, and m is an integer equal to at least 1, desirably 1–8 and more desirably from 1 to 4; n is an integer equal to at least 1, desirably, 1 to 20; and p is 0 or 1.

Typical of these monomers are mono-, di-, tri- tetra- and polyethylene glycol dimethacrylate and the corresponding diacrylates; di(pentamethylene glycol) dimethacrylate; tetraethylene glycol di(chloroacrylate); diglycerol diacrylate; diglycerol tetramethacrylate; butylene glycol dimethacrylate; neopentyl glycol diacrylate; and trimethylopropane triacrylate.

Particularly useful polymerizable crosslinkable components are ethoxylated trimethylolpropane triacrylate, trimethylol propane trimethacrylate, dipentaerythritol monohydroxypentacrylate, pentaerythritol triacrylate, ethoxylated trimethylolpropane triacrylate, 1,6-hexanedioldiacrylate, neopertyl glycoldiacrylate, pentaerythritol tetraacrylate, 1,2-butylene glycoldiacrylate, trimethylopropane ethoxylate tri(meth)acrylate, glyceryl propoxylate tri(meth)acrylate, trimethylolpropane tri(meth)acrylate, dipentaerythritol monohydroxy penta(meth)acrylate, tri(propylene glycol) di(meth)acrylate, neopentylglycol propoxylate di(meth)acrylate, 1,4-butanediol di(meth)acrylate, polyethyleneglycol di(meth)acrylate, triethyleneglycol di(meth)acrylate, butylene glycol di(meth)acrylate, ethoxylated bisphenol A di(meth)acrylate and combinations thereof.

Various useful urethane-acrylate type monomers, such as those described in U.S. Pat. No. 3,925,988 to Gorman, and U.S. Pat. No. 4,309,526 to Baccei, each of which are incorporated herein by reference may be used. The monomers disclosed in the '526 patent may be viewed as one-component polymerizable block copolymers (prepolymers) having rigid and flexible segments. This is achieved by the chemical linking of precursor "prepolymers" which are subsequently "capped" with (meth)acrylate, functionality.

Other useful monomers include those acrylates derived from bisphenol-A, such as bisphenol-A dimethacrylate, hydrogenated bisphenol-A dimethacrylate, and ethoxylated bisphenol-A dimethacrylate.

While di- and other polyacrylate esters have been found particularly desirable, monofunctional acrylate esters (esters containing one acrylate group) also may be used. When dealing with monofunctional acrylate esters, it is desirable to use an ester which has a relatively polar alcoholic moiety. Such materials are less volatile than low molecular weight alkyl esters and, more importantly, the polar group tends to provide intermolecular attraction during and after cure, thus producing more desirable cure properties, as well as a more durable sealant or adhesive. Particularly desirable are the polar groups selected from labile hydrogen, heterocyclic ring, hydroxy, amino, cyano, and halogen polar groups. Useful examples of compounds within this category include cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate. The materials are often incorporated as reactive diluents which are capable of copolymerizing with the various other polymerizable materials.

Other unsaturated reactive diluents, such as styrene and acrylonitrile, can also be used. When used, the concentration of such diluents should be less than about 60 percent by weight, and preferably about 40 to about 10 percent by weight of the composition, based on the total weight of the composition.

The optimized anaerobic adhesive compositions of the present invention include a simplified cure system which serves to room temperature cure anaerobic monomer compositions at speeds significantly faster than known compositions containing some of the same type of components.

The simplified cure systems of the present invention may be comprised of three components: a peroxide free radical initiator; a reducing agent for the initiator; and an accelerator for the initiator. It has been determined that to achieve the aforementioned advantages of the present invention, the relative amounts of free radical initiator to reducing agent is desirably substantially the same. Additionally, the relative amount of accelerator is desirably about half that of the free radical initiator component.

A number of well known initiators of free radical polymerization may be incorporated in the present invention. Among those include, without limitation, hydroperoxides, such as cumene hydroperoxide (CHP), paramenthane hydroperoxide, tertiary butyl hydroperoxide (TBH) and tertiary butyl perbenzoate. While the useful amounts of peroxide compounds typically range from about 0.1 to about 10% by weight of the total composition, the present invention achieves its speed of cure when about 1% by weight of the peroxide is used along with a substantially equal amount of the reducing agent, e.g., saccharin. Thus, for the cure speed advantages discussed herein, the ratio of peroxide to peroxide reducing agent (e. g., saccharin) is desirably about 1:1, and the ratio of peroxide to accelerator is desirably about 2:1.

Useful accelerators for the present invention include compounds having the following formula:

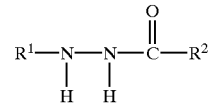

wherein $R^1$ is selected from alkyl from 2 to 6 carbon atoms, cycloalkyl, aryl, alkenyl, and cycloalkenyl and $R^2$ is selected from hydrogen, alkyl, cycloalkyl, alkenyl and cycloalkenyl, aryl, alkoxy, aryloxy, carbonyl, amino, and the following groups:

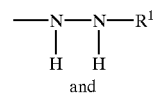
and

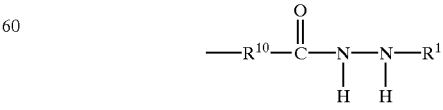

wherein $R^{10}$ is selected from alkyl groups containing one to about 10 carbon atoms, alkenyl groups containing two to about 10 carbon atoms, and aryl groups containing up to about 10 carbon atoms. Examples of useful accelerator compounds include 1-acetyl-2-phenyl hydrazine, 1-acetyl-2 (p-tolyl) para-toluene sulfonyl hydrazide, 1-formyl-2-phenyl hydrazine and combinations thereof. As previously noted, the ratio of peroxide to accelerator is desirably about 2:1. While the amount of accelerator can be proportionately varied to the amount of peroxide present, to achieve the aforementioned desired physical properties of the anaerobic adhesive composition the accelerator is desirably present in about 0.5% by weight of the total composition.

Stabilizers and inhibitors may also be employed as well as chelating agents to control and prevent premature peroxide decomposition and polymerization. Among those useful inhibitors include phenols such as hydroquinone and quinones. Chelating agents may be used to remove trace amounts of metal contaminants. An example of a useful chelating agent is the tetrasodium salt of ethylenediamine tetraacetic acid (EDTA).

Other agents such as thickeners, plasticizers, fillers, elastomers, thermoplastics, and other well-known additives may be incorporated where functionally desirable.

The DOE method used to optimize the compositions of the present invention includes first choosing a series of components and their relative ranges and entering them into a DOE software program, such as the commercially available program CAD/CHEM. The data entered represent independent variable data sets which represent potential anaerobic compositions from which an optimized composition will be determined. A statistically validated model is then generated for a given set of physical properties. Selected compositions are chosen for physical testing based on the desired properties previously identified. The results of physical testing are then fed into the computer and a neural network is used to correlate the test data with the adhesive compositions. The neural network uses a multilayered approach that approximates complex mathematical functions to process data. It consists of many processing elements or nodes that work in parallel. Nodes are connected to each other in layers and layers are interconnected. These nodes are mathematical functions. The connections between these nodes, which weight the data transformation from each node and send the information to the next node, are how the neural network "learns" or "thinks". The neural network is trained by real-life examples of data called training sets. The neural network creates connections and learns patterns based on these training sets. The network adapts to changing inputs and learns trends from data. A set of real-life examples, such as the physical data from a chosen anaerobic adhesive composition is entered into the neural network, which then weighs the connections between nodes based on each training example. Each connection weight builds on previous decision nodes which propagate to a final decision or outcome. As a final decision approaches, the network compares its answer against an answer in a training set. If there is a match, within a predefined tolerance, the neural network stores these connection weights as successful. If the decision outcome is outside a given tolerance level, the network cycles through the training set again.

Among various useful neural networks are back propagation neural networks, feed forward networks, radial basis function networks and probabilistic neural networks.

Objective test data which can be fed into the neural network and correlated with the adhesive compositions include physical strength data, stability data, heat resistance data, cure speed data, viscosity data, solvent resistance data, cure through gap data, thermal expansion data, toughness data, solubility data, density data, modulus data, Tg, heat aging data and combinations thereof. Among the strength data useful for optimizing anaerobic adhesive compositions are torque data, tensile data, shear data, compression data, elongation data, impact data and combinations thereof The method of optimization of the present invention is useful on various adhesive compositions in addition to anaerobic adhesive compositions. For example, the method may be used to optimize cyanoacrylate, silicone, epoxy and acrylic adhesive compositions.

EXAMPLES

The following optimized anaerobic composition was prepared in accordance with the following method of the present invention. To begin, a series of components and their relative amount ranges were defined. These represent potential anaerobic compositions, from which optimized compositions can be determined. Among the physical properties sought after were improved fixture or set time, the ability to develop greater strength more rapidly, as well as high ultimate cure strength. It is understood that final optimized compositions may or may not use all of the possible components listed. Rather, the components represent sets of data choices which are used to create an anaerobic adhesive composition model.

A matrix of potential anaerobic composition components and their relative amount ranges was established. This matrix was modeled using a commercially available DOE program known as CAD/CHEM. The components in this model are independent variables. The DOE software program statistically validates these models. Selected compositions are chosen for physical testing based on the desired properties previously identified by statistical analysis in the DOE software. The results of physical testing represent dependent variables which are then fed into the computer and correlated with the adhesive compositions to predict and extrapolate optimized properties for compositions not tested. Queries as to the best composition for a desired physical property can be input into the software and a predicted result is provided. Queries can also be entered to request a predicted physical property for a desired composition. For example, the DOE uses neural networks to learn and refine optimization of a given composition. Optimized compositions were obtained in this manner for enhanced cure speed and fixture time. The neural network correlated the physical test results with the anaerobic adhesive compositions to generate an optimized composition designed with the desired physical properties and cure profile.

The objective test data which can be measured for use with DOE techniques includes physical strength data, stability data, heat resistance data, cure speed date, viscosity data, solvent resistance data, cure through gap data, thermal expansion data, toughness data, solubility data, density data, modulus data, Tg, heat aging data and combinations thereof. Of particular significance in adhesive compositions is strength data, such as torque data, tensile data, shear data, compression data, elongation data, impact data and combinations thereof. Other physical properties such as stability and shelf life data may also be used in the present optimization method.

In addition to anaerobic adhesive compositions, the optimization method of the present invention may also be used to optimize cyanoacrylate adhesives, silicone adhesives, epoxy adhesives, acrylic adhesives and the like.

As a result of the above design experiment, an optimized anaerobic composition was generated having the following compositions:

| INVENTIVE COMPOSITION 1 | |
|---|---|
| COMPONENT | % WEIGHT |
| Monomers | |
| PEGMA[1] | 20.70 |
| EBIPMA[2] | 72.35 |
| Cure System | |
| Cumene Hydroperoxide | 1.0 |
| Saccharin | 1.0 |
| APH[3] | 0.5 |
| Other Additives | |
| Stabilizers, Chelators, Dyes, Thickeners | 4.45 |
| Total | 100.00 |

[1] polyethylene glycol dimethacrylate
[2] ethoxylated bisphenol A dimethacrylate
[3] 1-acetyl 2-phenyl hydrazine As a result of optimization, numerous cure components were omitted from the current commercial product and the relative percentages of the cure system components were adjusted to yield the desired properties.

The above inventive composition can be compared with Loctite Threadlocker 243, a commercially available anaerobically curable composition. Loctite Threadlocker 243 has a composition with the following parameters:

Commercially Available Loctite Threadlocker 243

| Component | % by Weight |
|---|---|
| PEGMA | 60-65 |
| PGDOA[1] | 20-25 |
| Poly(vinyl acetate) | 5-10 |
| Poly(ethylene) | 3-5 |
| Cumene Hydroperoxide | 1-3 |
| Castor Oil Derivative | 1-3 |
| Modified Silicon Dioxide | 1-3 |
| Saccharin | 1-3 |
| APH | 0.1-1 |
| Maleic Acid | 0.1-1 |

[1] polyglycol dioctanoate

Inventive Composition 1 was tested for room temperature torque strength on nuts and bolts made of various metals. The nuts were pretorqued on the bolts and tested in accordance with DIN 54454. These torque strengths were compared against Loctite Threadlocker 243 and the results are tabulated below. As noted from the tables, the amount of torque strength, as measured by inch-pounds, varies depending on the metal used. Certain metals, such as steel, copper or copper-containing alloys such as brass, are considered highly active surfaces because they accelerate the cure speed of anaerobic adhesive compositions. These compositions develop a greater portion of their final cure strength early on in the polymerization process. On less active surfaces, including stainless steel, zinc dichromate and cadmium, cure speeds are slower and the compositions take longer to develop their cure strength. Often final cure strengths on these surfaces are lower than an active substrate.

It is apparent from each of Tables 1–4, that Inventive Composition 1 exhibited significantly higher initial-break torque values at room temperature than the commercial anaerobic adhesive product Loctite Threadlocker 243, regardless of the type of metal used for nuts and bolts. Significantly higher physical strengths were achieved by the inventive compositions at each of the time intervals tested. It is generally understood by persons of ordinary skill in the art of anaerobic chemistry that full cure is reached after 24 hours at room temperature.

TABLE 1

Initial-Break Room Temperature Torque Values (Inch-Pounds) on Degreased Steel Nuts and Bolts

| | 5 min. | 10 min. | 30 min. | 1 hour | 24 hours |
|---|---|---|---|---|---|
| Inventive Composition 1 | 81 | 90 | 149 | 179 | 283 |
| Threadlocker 243* | 40 | 45 | 74 | 115 | 225 |

TABLE 2

Initial-Break Room Temperature Torque Values (Inch-Pounds) on Reoiled Steel Nuts and Bolts

| | 5 min. | 10 min. | 30 min. | 1 hour | 24 hours |
|---|---|---|---|---|---|
| Inventive Composition 1 | 45 | 50 | 86 | 90 | 213 |
| Threadlocker 243* | 39 | 44 | 53 | 56 | 113 |

TABLE 3

Initial-Break Room Temperature Torque Values (Inch-Pounds) on Zinc Nuts and Bolts

| | 5 min. | 10 min. | 30 min. | 1 hour | 24 hours |
|---|---|---|---|---|---|
| Inventive Composition 1 | 44 | 51 | 60 | 67 | 80 |
| Threadlocker 243* | 37 | 39 | 50 | 72 | 131 |

TABLE 4

Initial-Break Room Temperature Torque Values (Inch-Pounds) on Stainless Steel Nuts and Bolts

| | 5 min. | 10 min. | 30 min. | 1 hour | 24 hours |
|---|---|---|---|---|---|
| Inventive Composition 1 | 44 | 58 | 67 | 79 | 167 |
| Threadlocker 243* | 36 | 35 | 45 | 83 | 157 |

Table 5 below shows that the inventive compositions achieve a significantly greater percent of their ultimate physical strength within the first 5 minutes, as compared to Loctite 243*.

TABLE 5

Percent of 24 Hour Cure Torque Strength Reached For A Given Time Interval

| | INVENTIVE COMPOSITION 1 | Loctite 243 |
|---|---|---|
| Degreased Steel* | | |
| 5 min. | 28.6% | 17% |
| 10 min. | 31.8% | 20% |

TABLE 5-continued

Percent of 24 Hour Cure Torque Strength
Reached For A Given Time Interval

|  | INVENTIVE COMPOSITION 1 | Loctite 243 |
|---|---|---|
| 30 min. | 52.6% | 32% |
| 1 hour | 63% | 51% |
| Reoiled Steel* | | |
| 5 min. | 21% | 34% |
| 10 min. | 23% | 38% |
| 30 min. | 40% | 46% |
| 1 hour | 42% | 49% |
| Stainless Steel* | | |
| 5 min. | 26% | 22% |
| 10 min. | 34% | 22% |
| 30 min. | 40% | 28% |
| 1 hour | 47% | 52% |
| Zinc* | | |
| 5 min. | 55% | 28% |
| 10 min. | 63.75% | 29.8% |
| 30 min. | 75% | 38% |
| 1 hour | 83.75% | 55% |

*nuts and bolts were pretorqued in accordance with DIN 54454

The data set forth above demonstrates that in about 5 minutes or less, the inventive anaerobic adhesive compositions reach about 30% or more of their ultimate torque strength on substrates such as degreased steel and as much as 55% of its ultimate torque strength on zinc. On substrates such as reoiled steel, the inventive composition exhibits significantly enhanced speed of cure and ultimate torque strength as compared to Loctite Threadlocker 243. Table 2 shows the development of torque strength over specified time intervals for inventive composition 1 as compared to Loctite Threadlocker 243. At all time intervals, inventive Composition 1 exhibited higher torque strength, and particularly at the 1 hour interval, where Composition 1 exhibited nearly 50% greater torque strength than Loctite Threadlocker 243.

The examples set forth above serve to illustrate the present invention, but in no way are intended to limit the spirit and scope thereof, which is defined by the following claims.

What is claimed is:

1. A method of optimizing an anaerobic adhesive composition to produce a set of desired physical properties comprising:
   a.) providing in a machine readable storage medium a data set of anaerobic adhesive composition components;
   b.) generating a statistically validated experimental design model comprising a set of anaerobic adhesive compositions representing independent variables;
   c.) generating objective test data of said set of anaerobic adhesive composition from step b.), said test data results representing a set of dependent variables; and
   d.) establishing a correlation between said independent and dependent variables, whereby an optimized anaerobic adhesive composition for the physical properties desired is generated.

2. The method of claim 1 wherein said statistical validation of said independent variable data sets is performed using statistical analysis.

3. The method of claim 1 wherein said objective test data includes data selected from the group consisting of physical strength data, stability data, heat-resistance data, cure speed data, viscosity data, solvent resistance data, cure through gap data, thermal expansion data, toughness data, solubility data, density data, modulus data, Tg data, heat aging data, and combinations thereof.

4. The method of claim 2 wherein said strength data includes data selected from the group consisting of torque data, tensile data, shear data, compression data, elongation data, impact data and combinations thereof.

5. The method of claim 1 wherein said correlation between the objective test data and the statistically validated data set is performed by using a neural network.

6. The method of claim 1 wherein said physical properties are selected from the group consisting of cured torque strength, initial room temperature torque strength and combinations thereof.

7. The method of claim 1 wherein said anaerobic adhesive composition comprises:
   a.) at least one anaerobically curable (meth)acrylate monomer;
   b.) a cure system for said (meth)acrylate monomer comprising:
      (i) at least one free radical generating material;
      (ii) an acidic reducing agent for said free radical generating material; and
      (iii) an accelerator for the reduction of said free radical generating material.

8. The method of claim 7 wherein said anaerobic adhesive composition achieves about 30% or more of its 24 hour cured torque strength in about 5 minutes or less.

9. A method of optimizing an anaerobic adhesive composition to produce a set of desire physical properties comprising:
   a.) providing in a machine readable storage medium a data set of anaerobic adhesive composition components;
   b.) generating a statistically validated experimental design model comprising a set of anaerobic adhesive compositions representing independent variables, wherein said anaerobic adhesive composition comprises:
      a.) at least one anaerobically curable (meth)acrylate monomer;
      b.) a cure system for said (meth)acrylate monomer comprising:
         (i) at least one free radical generating material;
         (ii) an acidic reducing agent for said free radical generating material; and
         (iii) an accelerator for the reduction of said free radical generating material;
   c.) generating objective test data of said set of adhesive composition from step b.), said test data results representing a set of dependent variables, wherein said objective test data includes data selected from the group consisting of physical strength data, stability data, heat-resistance data, cure speed data, viscosity data, solvent resistance data, cure through gap data, thermal expansion data, toughness data, solubility data, density data, modulus data, Tg data, heat aging data, and combinations thereof; and
   d.) establishing a correlation between said independent and dependent variables, whereby an optimized anaerobic adhesive composition for the physical properties desired is generated.

10. The method of claim 8 wherein said statistical validation of said independent variable data sets is performed using statistical analysis.

11. The method of claim 10 wherein said strength data includes data selected from the group consisting of torque data, tensile data, shear data, compression data, elongation data, impact data and combinations thereof.

12. The method of claim 8 wherein said correlation between the objective test data and the statistically validated data set is performed by using a neural network.

13. The method of claim 8 wherein said physical properties are selected from the group consisting of cured torque strength, initial room temperature torque strength and combinations thereof.

14. The method of claim 8 wherein said anaerobic adhesive composition achieves about 30% or more of its 24 hour cured torque strength in about 5 minutes or less.

15. A method of optimizing an anaerobic adhesive composition to produce a set of desired physical properties comprising:
 a.) providing in a machine readable storage medium a data set of anaerobic adhesive composition components;
 b.) generating a statistically validated experimental design model by using statistical analysis comprising a set of anaerobic adhesive compositions representing independent variables, wherein said anaerobic adhesive composition comprises:
  a.) at least one anaerobically curable (meth)acrylate monomer;
  b.) a cure system for said (meth)acrylate monomer comprising:
   (i) at least one free radical generating material;
   (ii) an acidic reducing agent for said free radical generating material; and
   (iii) an accelerator for the reduction of said free radical generating material;
 c.) generating objective test data of said set of adhesive composition from step b.), said test data results representing a set of dependent variables, wherein said objective test data includes physical strength data selected from the group consisting of torque data, tensile data, shear data, compression data, elongation data, impact data and combinations thereof; and
 d.) establishing a correlation between said independent and dependent variables by using a neural network, whereby an optimized anaerobic adhesive composition for the physical properties desired is generated, wherein said physical properties are selected from the group consisting of cured torque strength, initial room temperature torque strength and combinations thereof.

16. The method of claim 15 wherein said anaerobic adhesive composition achieves about 30% or more of its 24 hour cured torque strength in about 5 minutes or less.

* * * * *

UNITED STATES PATENT AND TRADEMARK OFFICE
CERTIFICATE OF CORRECTION

PATENT NO.   : 6,903,147 B2
DATED        : June 7, 2005
INVENTOR(S)  : E. Maandi It is certified that error appears in the above-identified patent and that said Letters Patent is hereby corrected as shown below:

Column 1,
Line 46, should read -- ...all to Krieble --.

Column 2,
Line 54, should read -- Whereas the Krieble patents… --.

Signed and Sealed this

Thirteenth Day of September, 2005

JON W. DUDAS
*Director of the United States Patent and Trademark Office*